UNITED STATES PATENT OFFICE 2,236,541

PREPARATION OF SULPHONIC DERIVATIVES

Morris B. Katzman, Chicago, Ill., assignor to The Emulsol Corporation, Chicago, Ill., a corporation of Illinois No Drawing. Application December 14, 1939, Serial No. 309,162

25 Claims. (Cl. 260—401)

My invention relates to novel methods of preparing certain chemical compounds, particularly sulphonic derivatives and intermediates which are employed in the preparation of said sulphonic derivatives.

In my copending application, Serial No. 219,358, filed July 15, 1938, now Patent No. 2,184,770, issued December 26, 1939, I have disclosed the preparation of novel sulphonic compounds most of which fall within the scope of the general formula $$RO—(alk—NY)_m—CO—Z(—SO_3M)_w$$

wherein R is an organic radical containing at least four carbon atoms, alk stands for hydrocarbon, for example, alkylene, or arylene, such as ethylene or phenylene, Y is hydrogen, alkyl, cycloalkyl, alkoxyl, aralkyl, aryl, or alkylol, Z is preferably a hydrocarbon residue, containing preferably less than six carbon atoms, M is a cation, and m and w are whole numbers, preferably from one to four.

A more limited aspect of the compounds disclosed in said copending application is represented by the general formula

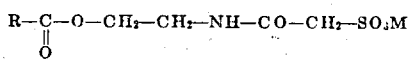

wherein R is a hydrocarbon radical or substituted hydrocarbon radical containing at least seven and preferably from eleven to seventeen carbon atoms, and M is a cation. Especially useful compounds are those wherein

is the acyl radical derived from a fatty acid containing upwards of ten carbon atoms to about eighteen carbon atoms, and wherein M is an alkali metal, ammonium, and particularly an ethanolamine cation.

In accordance with the methods specifically described in said copending application for producing the novel compounds disclosed therein, the reaction to produce the intermediate amide, for example, by reacting ethyl chloroacetate with an excess of monoethanolamine, was carried out in an aqueous medium. In order to remove the excess of monoethanolamine, oxalic acid was employed, the oxalic acid forming a precipitate with the monoethanolamine, namely, monoethanolamine oxalate. The water was then removed by evaporation, the monoethanolamine oxalate was filtered off, and the ethyl alcohol which formed during the reaction was distilled off under vacuum. The resulting N-beta-hydroxyethyl, chloracetamide, was then reacted with a carboxylic acyl halide having at least four and particularly from eight to eighteen carbon atoms to produce an ester, and the resulting ester was then reacted with an alkali sulphite to replace the chlorine of the chloracetamide radical with a sulphonic group.

While the method described hereinabove, and more particularly in my aforementioned copending application, is quite satisfactory, I have found that material improvements may be made in producing the novel sulphonic compounds which I have disclosed in said copending application as well as in the preparation of certain intermediates which are utilized in the preparation of said sulphonic compounds. In general, the improved methods of the present invention result in materially higher yields of the desired intermediate amide products, easier removal of such unreacted alcohol primary or secondary amines or, in other words, alcohol or alkylol, non-tertiary amines, as may be present, greater speed of reaction, and the like, the novel procedures contributing as a whole to the production of the desired ultimate products in a more efficacious manner and at substantially lower costs.

In general, the features of my present process involve the carrying out of the reaction of the alcohol ester of the halogeno-carboxylic acid or the like with the mono-ethanolamine or other alkylol non-tertiary amine in a non-aqueous medium. By a non-aqueous medium, I mean one which is substantially devoid of water. Thus, for example, only the two reactants may be present or one of them may be in excess in which case it may be regarded as a non-aqueous diluent. Again, an extraneous non-aqueous material such as methyl alcohol or ethyl alcohol may be added to the reaction mass to serve as a non-aqueous diluent.

A particularly important phase of my invention is based upon the discovery that methyl alcohol esters of halogeno-acetic acid, for example, methyl chloracetate, are far superior to the corresponding ethyl esters for reaction with mono-ethanolamine or similar alkylol non-tertiary amines to produce halogeno-acetamides of the monoethanolamine or the like. I have also discovered that, when such reaction is carried out a temperature not substantially exceeding +10 degrees C., and preferably falling within the range of about −10 degrees C. to +10 degrees C., the undesired alkylation of the monoethanolamine or the like is substantially avoided and far more complete amidification occurs with better yields of amide than is the case where the corresponding ethyl alcohol esters are used as starting materials. It should be understood that I regard this phase of my invention, though limited, to be highly important.

In my copending application, above identified, I have disclosed the following compounds, among others, which were within the scope of my invention therein claimed, and it will be clear that said compounds and others may be produced in accordance with my novel teachings herein.

(1) $C_{17}H_{33}-C(=O)-O-CH_2-CH_2-NH-CO-CH_2-SO_3Na$ (2) $C_{17}H_{35}-C(=O)-O-CH_2-CH_2-NH-CO-CH_2-SO_3K$ (3) $C_{11}H_{27}-C(=O)-O-CH_2-CH_2-NH-CO-CH_2-SO_3NH_4$ (4) $C_{17}H_{33}-C(=O)-O-C_2H_4-NH-CO-CH_2-CH_2-SO_3Na$ (5) $C_7H_{15}-C(=O)-O-CH_2-CH_2-NH-CO-CH_2-SO_3\cdot N(C_2H_4OH)(C_2H_4OH)(H)(C_2H_4OH)$ (6) $C_{17}H_{33}-C(=O)-O-CH_2-CH(OH)-CH_2-NH-CO-CH_2-SO_3K$ (7) $C_{10}H_{21}-C(=O)-O-CH_2-CH_2-NH-CO-CH_2-SO_3\cdot N(C_2H_4OH)(H)(H)$ (8) $C_{12}H_{25}-O-CH_2-CH_2-NH-CO-CH_2-SO_3\cdot N(H)(C_6H_{11})$ (9) $C_{11}H_{23}-C(=O)-O-CH_2-CH_2-CH_2-NH-CO-CH_2-SO_3NH_4$

(10) $C_{19}H_{29}-C(=O)-O-CH_2-CH_2-NH-CO-CH_2-SO_3\cdot N(C_2H_4OH)(C_2H_4OH)(H)(C_2H_4OH)$

(11) $CH_3-(CH_2)_9-CH(OH)-C(=O)-O-CH_2-CH_2-NH-CO-CH_2-SO_3Na$

(12) (naphthyl)$-C(=O)-O-CH_2-CH_2-NH-CO-CH_2-SO_3K$

(13) (phenyl)$-C(=O)-O-CH_2-CH_2-NH-CO-CH_2-SO_3K$

(14) (cyclohexyl)$-CH-C(=O)-O-CH_2-CH_2-NH-CO-CH_2-SO_3Na$

(15) $C_{11}H_{23}-C(=O)-O-CH_2-CH_2-NH-CO-CH_2-SO_3\cdot N(C_2H_4OH)(C_2H_4OH)(H)(C_2H_4OH)$

(16) $C_{13}H_{27}-C(=O)-O-CH_2-CH_2-NH-CO-CH_2-SO_3\cdot N(C_2H_4OH)(C_2H_4OH)(H)(H)$

(17) $C_{16}H_{33}-O-CH_2-CH_2-NH-CO-CH_2-SO_3K$

(19) $C_8H_{17}-O-CH_2-CH_2-NH-CO-CH_2-SO_3Na$

(19) $C_{11}H_{23}-C(=O)-O-CH_2-CH_2-CH_2-CH_2-NH-CO-CH_2-CH_2-SO_3K$

(20) $C_{15}H_{31}-C(=O)-O-C_2H_4-NH-CO-CH_2-SO_3\cdot N(C_2H_5)(C_2H_5)(H)(C_2H_5)$

(21) $CH_3-(CH_2)_7-CHCl-CHCl(CH_2)_7-C(=O)-O-CH_2-CH_2-NH-CO-CH_2-SO_3K$

(22) $C_{11}H_{23}-C(=O)-O-CH_2-CH_2-O-CH_2-CH_2-NH-CO-CH_2-SO_3\cdot N(C_2H_5)(C_2H_5)(H)(C_2H_5)$

(23) $C_{11}H_{27}-C(=O)-O-CH_2-CH_2-NH-CH_2-CH_2-NH-CH_2-CH_2-NH-CO-CH_2-SO_3K$

(24) $C_{11}H_{23}-C(=O)-O-C_2H_4-N(C_2H_4OH)-CO-CH_2-SO_3K$

(25) $C_{11}H_{23}-C(=O)-O-C_2H_4-NH-CO-CH_2Cl$

(26) $C_{16}H_{33}-O-C_2H_4-NH-CO-CH_2Br$

(27) $C_{11}H_{27}-C(=O)-O-C_2H_4-N(C_2H_4OH)-CO-CH_2Cl$

(28) $C_{11}H_{23}-C(=O)-O-(C_6H_{10})-NH-CO-CH_2-SO_3K$

(29) $C_{11}H_{23}-C(=O)-O-C_2H_4-O-C_2H_4-NH-C(=O)-CH_2-SO_3Na$

(30) $C_8H_{19}-C(=O)-O-C_2H_4-S-C_2H_4-NH-C(=O)-CH(SO_3K)-CH_3$

(31) $C_{17}H_{33}-C(=O)-O-C_2H_4-NH-C(=O)-CH(SO_3Na)-CH(SO_3Na)-CH_3$ (oleyl)

(32) $C_{11}H_{23}-C(=O)-O-C_2H_4-NH-C(=O)-CH(SO_3K)-CH_2-C(=O)-OC_2H_5$

In general, as indicated hereinabove, the compounds are prepared, in accordance with the present invention, by initially reacting an alcohol primary or secondary amine or, in other words, alcohol or alkylol non-tertiary amine, including corresponding alkylol polyamines, with a lower molecular weight alcohol ester of a lower molecular weight halogeno-carboxylic acid, the reaction being conducted in a non-aqueous medium and the alcohol ester being preferably in excess, the conditions being such as to insure a substantial yield of amide. The alcohol ester should best be that derived from a volatile alcohol such as methyl alcohol or ethyl alcohol but, as indicated hereinabove, methyl alcohol esters of halogeno-acetic acid, particularly methyl chloracetate, are outstandingly useful, especially when the amidification reaction with monoethanolamine or the like is conducted at low temperatures, preferably between about —10 degrees C. and about +10 degrees C. The resulting amide, preferably after certain purification steps, is reacted, as described in my aforementioned copending application, with preferably a higher molecular weight organic acid halide, anhydride or other agent or combination of agents, for example, mixtures of higher fatty acids with thionyl halides such as thionyl chloride, or mixtures of higher fatty acids with phosphorus halides such as phosphorus trichloride or phosphorus pentachloride, to introduce a higher acyl radical into the molecule whereby to produce an ester of the amide, and with an alkali sulphite, for example, sodium, potassium, ammonium, or lithium sulphite, to introduce a sulphonic group into the molecule.

An alternative method, although not, in general, quite as satisfactory as my preferred methods described generally hereinabove, comprises initially producing an alcohol ester of a sulphocarboxylic acid and reacting the resulting ester, for example, ethyl sulphoacetate, potassium salt, with a non-tertiary alkylolamine, for example, monoethanolamine, the reaction being conducted at elevated temperatures and in a non-aqueous medium, to produce the sulpho-acetamide of monoethanolamine or the like. This amide is then reacted with a carboxylic acyl halide containing at least 4 and particularly from 8 to 18 carbon atoms to produce the corresponding ester of the sulpho-acetamide of monoethanolamine or the like. The reaction of the ethyl sulphoacetate, potassium salt, and the monoethanolamine, or similar compounds, is carried out preferably at temperatures of the order of 100 degrees C. or somewhat higher but below the decomposition temperature of either of the reacting constituents or the desired product, and with vigorous mixing or kneading.

The following examples are illustrative of the novel methods which have been described generally hereinabove for preparing various of the compounds which I disclosed in my aforementioned copending application. It will be appreciated that variations may be made in the procedure described in said examples, for instance, by varying the proportions of reacting constituents, times of reaction, temperatures, and the like, and various supplementary processes of purification may be resorted to wherever found desirable or convenient. These and other variations and modifications will be evident to those skilled in the art in the light of the guiding principles which are disclosed herein.

Example A (1) To 217 grams (2 mols) of methyl chloracetate 62 grams (1 mol) of monoethanolamine were added slowly with stirring, the temperature of the mixture being kept at approximately 0 degrees C. The addition of the monoethanolamine was made over a period of about 1¼ hours, a small amount of finely divided solid carbon dioxide being added to the reaction product to help maintain the temperature at about 0 degrees C. The reaction product was then subjected to a vacuum at a temperature of 20 degrees C. to 50 degrees C. and at an absolute pressure of 12 mm. to 70 mm. in order to remove the methyl alcohol which formed during the reaction, the carbon dioxide, and at least most of the excess methyl chlor acetate. Approximately 180 grams of a reaction product was obtained consisting essentially of the chloracetamide of monoethanolamine

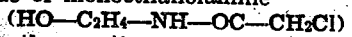

(2) To the reaction product of part (1) hereof, 330 grams of lauroyl chloride (approximately 63% pure, the balance comprising largely lauric acid) were added and the mass was heated, with stirring and under vacuum, for one hour at a temperature ranging from 60 degrees C. to 95 degrees C., in order to remove the hydrochloric acid which formed during the reaction. The reaction mass was then washed four times with tap water at 65 degrees C. until free of hydrochloric acid.

(3) To the reaction product of part (2) hereof there was added a solution containing 53.2 grams of potassium meta bisulphite, 26.8 grams of potassium hydroxide and 160 cc. of water and the mixture was heated, with stirring, for approximately ¾ of an hour to an hour at a temperature ranging from 70 degrees C. to 95 degrees C.

(4) 435 grams of the reaction product of part (3) hereof were added to 3 liters of isopropyl alcohol and the mixture was heated to boiling, with stirring, the mass then being filtered, while hot, in order to remove inorganic salts, and the alcohol filtrate was allowed to cool to room temperature whereupon a crystalline material separated out. The crystalline material was separated from the solution by filtering and the crystals were washed with a small amount of ether and then air-dried. The finally obtained crystals were white, had good foaming properties and comprised essentially a compound having the following formula:

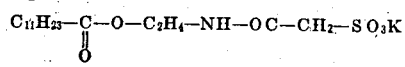

If desired, instead of purifying the compound to remove the inorganic salts, said salts may be permitted to remain. However, the isopropyl alcohol or other solvent should still preferably be employed in order to remove unreacted or free fatty acids or soaps which may be present, such fatty materials, in general, interfering with the foaming properties of the desired product. It will be understood that I prefer to purify the product in order to obtain the best results, but, if desired, the product may be used in the form of the impure reaction mixture.

(5) In order to convert the potassium salt of the compound of part (4) hereof into an alkylolamine salt, alkylolamine salts of such compounds being particularly preferred for certain purposes, the following procedure was carried out:

432 grams of the lauric acid ester of the sulphoacetic acid amide of monoethanolamine (potassium salt), corresponding to the formula:

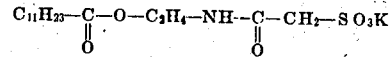

were dissolved in 1483 grams of water, at 60 degrees C. and there was added thereto, with stirring, a solution of 213 grams of tartaric acid in 213 cc. of water. There was then added thereto, with vigorous stirring, a solution of 88 grams of monoethanolamine in 88 cc. of water. The final product was cooled to about 20 degrees C. to 22 degrees C. and filtered to remove the precipitate of potassium acid tartrate which formed during the reaction. To the clear, limpid filtrate, 11 cc. of monoethanolamine were added in order to neutralize the solution to a pH of about 6.0. The solution contained a substantial proportion of the monoethanolamine salt of the sulphoacetic acid amide of the lauric acid ester of monoethanolamine, said compound having the following formula:

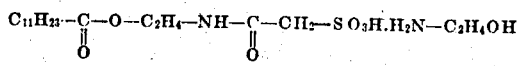

The solution had excellent foaming and detergent properties, and possessed general utility as an interface modifying agent. It was also ideally suited for use as a hair shampoo. If desired, the consistency of the solution can be increased, or, in other words, the solution may be thickened by adding thereto monoethanolamine sulphate. This was conveniently accomplished by making up the volume of the clear limpid filtrate to 2750 cc. by the addition thereto of water and there were then added thereto, with stirring, 1150 cc. of an aqueous solution containing 40% monoethanolamine sulphate, namely, the sulphuric acid salt of monoethanolamine. The final product was a clear, viscous material which was very satisfactory as a shampoo base.

In the above example, it will be noted that the molal ratio of the methyl chlor acetate to the monoethanolamine was 2 to 1. Equal molal ratio may be employed but it is preferred, in order to obtain the best yields, to use an excess of methyl chlor acetate. In general, a molal ratio of methyl chlor acetate to monoethanolamine of about 1.5 to 1 to about 2 to 1 is preferred, the latter molal ratio representing close to the optimum operating conditions.

It should also be understood that the use of solid carbon dioxide may be omitted and, if desired, oxalic acid may be employed to precipitate excess monoethanolamine should the reaction be carried out in such a manner that excess monoethanolamine is present. This, however, does not represent the preferred embodiment of the invention.

*Example B*

(1) 108.5 grams of methyl chlor acetate were dissolved in 327 grams of methyl alcohol and there were added thereto, slowly and with stirring, 74.4 grams of monoethanolamine. The reaction mixture was maintained at a temperature of about −10 degrees C. for approximately 1¼ hours. The temperature was then allowed to rise over a period of about 1 hour to +10 degrees C. at which stage the amidification reaction was approximately 98% complete. The slight excess of monoethanolamine was then removed by adding slowly, and with stirring, 17.32 grams of oxalic acid dissolved in 30 cc. of methyl alcohol. The precipitated oxalic acid salt of monoethanolamine was then filtered off and the methyl alcohol was evaporated off under vacuum from the filtrate. At room temperature, the reaction product was a viscous, pale straw to amber colored liquid and consisted essentially of the chloracetamide of monoethanolamine.

(2) 124 grams of the reaction product of part (1) hereof were mixed with 176.5 grams of 90% pure lauroyl chloride and the mixture was heated, with stirring and under vacuum, for 1 hour at about 70 degrees C. until no more hydrochloric acid was driven off. The reaction mass was then washed twice, each time with 4 liters of water at 60 degrees C. until the wash water was free of hydrochloric acid.

(3) 150 grams of the reaction product of part (2) hereof were added to a solution of 80 grams of sodium sulphite in 500 cc. of water and the mass was stirred at a temperature of 95 degrees C. to 98 degrees C. for approximately an hour, the chlorine splitting off and being replaced by the group SO₃Na. The resulting product consisted essentially of a compound having the formula

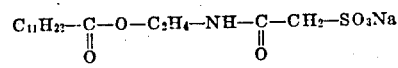

mixed with inorganic salts such as sodium chloride. If desired, the product may be purified as described in Example A hereinabove.

Instead of washing the reaction product of part (2) hereof in order to rid the same of hydrochloric acid, an alternative procedure may be employed involving the use of sodium hydroxide or potassium hydroxide, the latter being added together with the sodium sulphite in the step, described by part (3) hereof, of replacing the chlorine by the sulphonic acid group.

In Example B hereinabove it will be noted that methyl alcohol is used as a diluent, the monoethanolamine is employed in slight excess and the excess thereof is removed by precipitation with oxalic acid.

*Example C*

(1) 244 grams of ethyl chloracetate were stirred for four hours at 25 degrees C.–30 degrees C. with a solution made of 266 grams of potassium metabisulphite, 133 grams of potassium hydroxide and 800 cc. of water. The reaction mixture was then chilled in an ice bath and so maintained for about 2 hours and the resulting crystalline mass was filtered by suction. Approximately 195 grams of a crystalline reaction product were obtained consisting essentially of ethyl sulphoacetate, potassium salt. This reaction product contained about 3% of potassium chloride and the filtrate was concentrated by blowing air over the surface thereof and a second crop of crystals, amounting to 85 grams, was obtained, said crystals being filtered off. This batch of crystals also contained approximately 3% potassium chloride. If desired, the mother liquor may again be concentrated to obtain further batches of crystals but it is preferred not to continue with repeated crystallization since the product becomes too much concentrated with potassium chloride.

(2) 108 grams of the ethyl sulphoacetate, potassium salt, produced in accordance with part (1) hereof, were thoroughly mixed with 31 grams of monoethanolamine and the mixture was heated for 8 hours at 100–110 degrees C. During the period of heating, it was thoroughly mixed or kneaded. It was then allowed to remain in an oven at a temperature of 85 degrees C. to 90 degrees C. for several hours. The final product comprised a solid, nearly white, hard cake consisting essentially of a compound having the following formula:

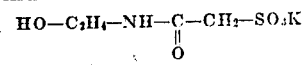

112 grams of the product were obtained, the theoretical yield being 114 grams. The product was then ground in a mortar to pass through a sieve having 40 meshes to the linear inch.

(3) 100 grams of the reaction product of part (2) hereof and 73 grams of lauroyl chloride (containing 75% lauroyl chloride, the balance comprising largely lauric acid) were mixed together and evacuated in order to draw off the hydrochloric acid which formed during the reaction period. The mixture was heated on a water bath for a period of 6 hours at a temperature between 75 degrees C. and 85 degrees C., the mass being constantly mixed during the heating period in order to break up the lumps of the product. The final product, when ground, was a nearly white powder consisting essentially of a compound having the formula

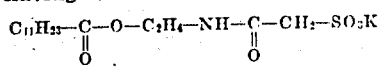

The product may be purified, if desired, by extraction with ethylene dichloride, ether or other fat-solvents.

*Example D*

(1) To 1085 grams of methyl chloracetate, maintained at about 0 degrees C., there were added, slowly and with stirring over a period of about 10 minutes, 525 grams of diethanolamine also maintained at a temperature of about 0 degrees C. The temperature rose to about +10 degrees C. and the reaction mass was then allowed to stand whereupon the temperature rose to 24 degrees C. The reaction mass was then allowed to stand at approximately this temperature for twelve hours. The methyl alcohol which formed during the reaction and the excess methyl chloracetate were distilled off in vacuo at a temperature of about 60 degrees C. The reaction product contained a substantial proportion of the chloracetamide of diethanolamine.

(2) To 94 grams of the reaction product of part (1) hereof there were added dropwise and with stirring 99 grams of lauroyl chloride, the addition being made over a period of about 20 minutes and while maintaining the reaction mass at a temperature ranging from 80 degrees C. to 100 degrees C. The final reaction product was a clear, light amber, semi-viscous material containing a substantial proportion of a compound having the following formula:

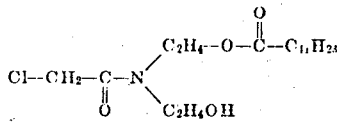

(3) 175 grams of the reaction product of part (2) hereof were mixed with a solution comprising 81.5 grams of $K_2S_2O_5$, 69.7 grams of KOH, and 276 cc. of water, the mixture being stirred and heated for about one hour at a temperature ranging from 65 degrees C. to 90 degrees C. The reaction product contained a substantial proportion of a compound having the following probable formula:

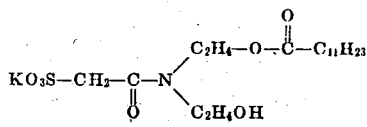

(4) The reaction product of part (3) hereof was purified by adding thereto 3600 cc. of isopropyl alcohol containing 41 cc. of concentrated hydrochloric acid previously heated to 50 degrees C. The mixture was then stirred and heated to 80 degrees C. and the inorganic salts were filtered off. The filtrate was then cooled to room temperature in a cold water bath, 1000 cc. of isopropyl alcohol were added to said solution and the precipitate which formed was then filtered off. The precipitate comprised a thick, white paste which had good foaming, wetting, detergent and surface modifying properties. It comprised essentially the sulpho-acetamide of the mono-lauric acid ester of diethanolamine, having the formula set out hereinabove under part (3).

*Example E*

(1) 75 grams of the chlor-acetamide of mono-ethanolamine, produced as described in part (1) of Example A, and 80 grams of lauric acid were mixed together at a temperature of 30 degrees C. and to this mixture there were added, over a period of about 10 minutes, with stirring, 55 grams of thionyl chloride. The temperature rose to 55 degrees C. The mixture was then heated to 90 degrees C. and maintained at that temperature for twenty minutes, hydrochloric acid gas and sulphur dioxide gas, which formed during the reaction, being permitted to escape. To the resulting reaction mass there were then added 55 grams of thionyl chloride, the addition being gradual and with stirring over a period of about 10 minutes. The resulting mixture was then heated to 90 degrees C. and maintained at that temperature for about 20 minutes, the excess thionyl chloride then being removed in vacuo.

(2) The reaction product of part (1) hereof was then reacted with potassium meta-bisulphite, as described in part (3) of Example A hereinabove. The resulting reaction product contained a substantial proportion of the lauric acid ester of the sulpho-acetamide of mono-ethanolamine which had properties of the character described in the previous examples.

It will be understood that the novel processes of my present invention may be employed for producing any of the novel compounds which I have disclosed in my aforementioned copending application.

As described in said copending application, the organic radical represented by R in the general formulae may be derived from various sources. Among such sources may be mentioned straight chain and branched chain carboxylic, aliphatic, and fatty acids, saturated and unsaturated, such as butyric acid, caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, partially or completely hydrogenated animal and vegetable oils such as those mentioned; hydroxy and alpha-hydroxy higher aliphatic and fatty acids such as i-hydroxy stearic acid, dihydroxy stearic acid, alpha-hydroxy stearic acid, alpha-hydroxy palmitic acid, alpha-hydroxy lauric acid, alpha-hydroxy coconut oil mixed fatty acids, and the like; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acid and abietic acid; aromatic acids such as phthalic acid, benzoic acid, naphthoic acid, pyridine carboxylic acids; hydroxy aromatic acids such as salicylic acid, hydroxy benzoic and naphthoic acids, and the like; and substitution and addition derivatives of the aforementioned carboxylic substances. It will be understood that mixtures of any two or more of said acids may be employed if desired. These acids are utilized especially in the form of their acyl halides.

The halogeno-carboxylic acids which, in the form of their esters, particularly with methyl alcohol, are reacted with the alcohol or alkylol primary and secondary amines may be selected from a relatively large class including mono-, di-, and poly-carboxylic derivatives as, for example, mono chloracetic acid, mono bromacetic acid, mono iodo acetic acid, alpha-chlor propionic acid, alpha-brom propionic acid, alpha-chlor butyric acid, alpha-bromo capric acid, mono chlor succinic acid, dichlor succinic acid, di chlor, glutaric acid, and the like. Of special utility, as previously indicated, are methyl alcohol esters of the halogeno acetic acids, particularly, methyl chlor acetate.

The alcohols whose halogeno-carboxylic esters are reacted with the alcohol primary and secondary amines are preferably of lower molecular weight, especially the volatile alcohols, namely, methyl alcohol and ethyl alcohol, being preferred with the methyl alcohol being especially desirable when utilized under the conditions described hereinabove. It will be understood that the reactivity of the alcohol esters of the halogeno carboxylic acids or of the sulpho-carboxylic acids in connection with the formation of the amides therefrom with monoethanolamine or the like is dependent upon the alcohol portion of the ester molecule as well as upon the halogeno carboxylic acid or sulpho-carboxylic acid with which it is esterified. In general, the higher in the homologous series of the alcohol and of the halogeno-carboxylic acid or sulpho-carboxylic acid, the less reactive are the materials and the full measure of the advantages of the present invention is not obtainable.

The alcohol or alkylol primary and secondary amines, in other words, the alcohol or alkylol non-tertiary amines, which are reacted with methyl chlor acetate or the like to produce the halogen-containing amides include, among others, by way of example, monoethanolamine, diethanolamine, monopropanolamine, di-propanolamine, monobutanolamine, ethyl monoethanolamine, the mono ethyl ether of diethanolamine, mono-cyclohexyl, beta-hydroxy-ethyl amine; monobutyl, beta-hydroxyethyl amine; ethanol aniline; 1-amino-propanediol-2,3; glycerol and other polyhydric alcohol and sugar or sugar alcohol primary and secondary amines such as glycerol mono amine, sorbitol mono amine, mannitol mono amine, and the like. As indicated hereinabove, monoethanolamine is especially satisfactory in carrying out the novel processes of the present invention.

Wherever the term "higher" is employed as referring to higher molecular weight organic or fatty acids or the like, it will be understood to cover compounds or radicals having at least six carbon atoms, unless otherwise specifically stated.

Wherever the term "sulphonic group," "sulphonic radical," "sulpno acetamide" or like expression is employed in the claims, it will be understood to refer to the compounds irrespective of whether the hydrogen of the sulphonic acid radical is present as such or replaced by another cation, unless the connotation otherwise expressly indicates differently.

What I claim as new and desire to protect by Letters Patent of the United States is:

1. The method of preparing chemical compounds which comprises reacting an ester of a halogeno-carboxylic acid with an alcohol non-tertiary amine to form an amide, said reaction being conducted in a substantially non-aqueous medium, and then introducing into the amide (1) a sulphonic group and (2) an organic radical containing from eight to eighteen carbon atoms.

2. The method of preparing chemical compounds which comprises reacting a methyl alcohol ester of a member selected from the group consisting of chloracetic acid, bromacetic acid and iodo acetic acid, with an alkylol non-tertiary amine to form an amide, said reaction being carried out at a temperature of the order of —10 degrees C. to +10 degrees C., and then introducing into said amide (1) a sulphonic group and (2) a fatty acid radical containing from eight to eighteen carbon atoms.

3. The method of claim 2 wherein the alkylolamine comprises a member of the group consisting of monoethanolamine, diethanolamine and mixtures thereof.

4. The method of claim 2 wherein the sulphonic group is introduced into the molecule subsequent to the introduction into the molecule of said fatty acid radical.

5. The process of preparing chemical compounds which comprises reacting the methyl ester of chloracetic acid with monoethanolamine, in a substantially non-aqueous medium, at temperatures of about —10 degrees C. to about +10 degrees C. to produce essentially N-beta-hydroxyethyl, chlor-acetamide, then reacting said amide with a fatty acid acyl halide containing from eight to eighteen carbon atoms to produce the corresponding fatty acid ester of said amide, and then reacting said compound with an alkali metal sulphite whereby the chlorine group of the fatty acid ester of the N-beta-hydroxyethyl, chloracetamide is replaced by a sulphonic group.

6. The process of preparing chemical compounds which comprises reacting at least one mol of the methyl ester of chloracetic acid with one mol of a mono-alkylolamine at a low temperature to produce essentially the chloracetamide of the monoalkylolamine, then reacting said amide with a fatty acid acyl halide containing from eight to eighteen carbon atoms to produce the corresponding ester of said amide, and then reacting said compound with an alkali metal sulphite whereby the chlorine group of the ester of the amide is replaced by a sulphonic group.

7. The process of preparing chemical compounds which includes the steps of reacting the methyl ester of chloracetic acid with monoethanolamine, in a substantially non-aqueous medium, at temperatures of about —10 degrees C. to +10 degrees C. to produce essentially N-beta-hydroxyethyl, chloracetamide, distilling off methyl alcohol which forms during the reaction and such unreacted methyl chloracetate which may be present, reacting the N-beta-hydroxyethyl, chloracetamide to form a higher molecular weight fatty acid ester thereof, and then reacting said ester with an aqueous solution of an alkali metal sulphite whereby the chlorine group of the fatty acid ester of the N-beta-hydroxyethyl, chloracetamide is replaced by a sulphonic group.

8. The method of preparing chemical compounds which includes the step of reacting monoethanolamine with an excess of a stoichiometric equivalent amount of methyl chloracetate, in a substantially non-aqueous medium, at a temperature between about —10 degrees C. and +10 degrees C. to convert the monoethanolamine into N-beta-hydroxyethyl, chloracetamide.

9. The method of preparing chemical compounds which includes the step of reacting an alkylol non-tertiary amine with a methyl ester of a halogeno-acetic acid, in a substantially non-aqueous medium, at a temperature sufficiently low to avoid appreciable alkylation of the alkylolamine but effective to produce high yields of the halogeno-acetamide of the alkylolamine.

10. The method of preparing chemical compounds which includes the step of reacting monoethanolamine with methyl chloracetate, in a substantially non-aqueous medium, at a temperature between about —10 degrees C. and about +10 degrees C. to convert the monoethanolamine into N-beta-hydroxyethyl, chloracetamide.

11. The method of preparing chemical compounds which includes the step of reacting a mono-alkylolamine with a methyl ester of a halogeno-acetic acid, in a substantially non-aqueous medium, at a temperature not substantially above +10 degrees C. to convert the monoalkylolamine into the halogeno-acetamide thereof.

12. The method of preparing chemical compounds which includes the step of reacting a mono-alkylolamine with methyl chloracetate, in a substantially non-aqueous medium, at a temperature between about −10 degrees C. and about +10 degrees C. to convert the mono-alkylolamine into the chloracetamide thereof.

13. The method of preparing chemical compounds which includes the step of reacting monoethanolamine with a methyl ester of a halogenoacetic acid, in a substantially non-aqueous medium at a temperature between about −10 degrees C. and about +10 degrees C. to convert the monoethanolamine into N-beta-hydroxyethyl, halogeno-acetamide.

14. The method of preparing chemical compounds which includes the step of reacting monoethanolamine with methyl chloracetate, in a substantially non-aqueous medium, at a temperature between about −10 degrees C. and about +10 degrees C. to convert the monoethanolamine into N-beta-hydroxyethyl, chloracetamide, and then introducing into said N-beta-hydroxethyl, chloracetamide a sulphonic group and an organic radical containing at least four carbon atoms.

15. The process of preparing chemical compounds which comprises reacting, in a substantially non-aqueous medium, a lower molecular weight alcohol ester of a lower molecular weight halogeno-carboxylic acid with an alkylol non-tertiary amine to produce essentially a halogenocarboxylic acid amide of the alkylolamine, then reacting said amide with an acyl halide containing at least four carbon atoms to produce the corresponding ester of said amide, and then reacting said compound with an alkali metal sulphite whereby the chlorine group of the ester of the amide is replaced by a sulphonic group.

16. The method of preparing chemical compounds which comprises reacting, in a substantially non-aqueous medium, a lower molecular weight alcohol ester of a member selected from the group consisting of chloracetic acid, bromacetic acid, and iodo acetic acid, with an alkylol non-tertiary amine to form an amide, and then introducing, at opposite ends of the amide, (1) a fatty acid radical containing at least four carbon atoms and (2) a sulphonic group.

17. The method of claim 16 wherein the alkylolamine comprises a member of the group consisting of monoethanolamine, diethanolamine, and mixtures thereof.

18. The process of preparing chemical compounds which comprises reacting the methyl ester of chloracetic acid with monoethanolamine, in a substantially non-aqueous medium, at temperatures of about −10 degrees C. to about +10 degrees C. to produce essentially N-beta-hydroxyethyl, chloracetamide, then reacting said amide with lauroyl chloride to produce the lauric acid ester of said amide, and then reacting said compound with an alkali metal sulphite whereby the chlorine group of the lauric acid ester of the N-beta-hydroxyethyl, chloracetamide is replaced by a sulphonic group.

19. The method of preparing chemical compounds which comprises reacting ethyl sulphoacetate with monoethanolamine, in a substantially non-aqueous medium, at elevated temperatures while mixing or kneading the reaction mass, to form the sulpho-acetamide of monoethanolamine, and then esterifying said amide by reacting it with a fatty acid acyl halide having from eight to eighteen carbon atoms.

20. The method of preparing chemical compounds which comprises reacting ethyl sulphoacetate with an alkylol non-tertiary amine, in a substantially non-aqueous medium, to form a sulpho-acetamide of the alkylolamine, and then reacting said amide with a carboxylic acyl halide containing at least four carbon atoms.

21. The method of claim 20 wherein the alkylolamine comprises a member of the group consisting of monoethanolamine, diethanolamine, and mixtures thereof.

22. The method of preparing chemical compounds which comprises reacting ethyl sulphoacetate with monoethanolamine, in a substantially non-aqueous medium, to form a sulphoacetamide of monoethanolamine, and then reacting said amide with a fatty acid acyl halide having from eight to eighteen carbon atoms.

23. The method of preparing chemical compounds which comprises reacting a volatile alcohol ester of a lower molecular weight sulphocarboxylic acid with an alkylol non-tertiary amine, in a substantially non-aqueous medium, to form a sulpho-carboxylic acid amide of the alkylolamine, and then reacting said amide with an acyl halide containing at least four carbon atoms.

24. The method of preparing chemical compounds which comprises reacting monoethanolamine with a methyl alcohol ester of a member selected from the group consisting of salts of halogeno-acetic acid and sulpho-acetic acids, in a substantially non-aqueous medium, to form amides of monoethanolamine, and then reacting said amides with a fatty acid acyl halide containing from eight to eighteen carbon atoms.

25. The method of preparing chemical compounds which comprises reacting an alkylol non-tertiary amine with a volatile alcohol ester of a member selected from the group consisting of salts of lower molecular weight halogeno-carboxylic and sulphocarboxylic acids, in a substantially non-aqueous medium, to form amides of said alkylolamine, and then reacting said amides with a carboxylic acyl halide containing from eight to eighteen carbon atoms.

MORRIS B. KATZMAN.